US007891397B2

(12) United States Patent
Krämer et al.

(10) Patent No.: US 7,891,397 B2
(45) Date of Patent: Feb. 22, 2011

(54) LABELING MACHINE, A VACUUM DRUM FOR USE IN A LABELING MACHINE, AND A METHOD OF USING A LABELING MACHINE HAVING A VACUUM DRUM

(75) Inventors: Klaus Krämer, Dortmund (DE); Bert Wenzlawski, Oer-Erkenschwick (DE)

(73) Assignee: KHS AG, Dortmund (DE)

( * ) Notice: Subject to any disclaimer, the term of this patent is extended or adjusted under 35 U.S.C. 154(b) by 205 days.

(21) Appl. No.: 12/235,668

(22) Filed: Sep. 23, 2008

(65) Prior Publication Data

US 2009/0078363 A1 Mar. 26, 2009

Related U.S. Application Data

(63) Continuation-in-part of application No. PCT/EP2007/002579, filed on Mar. 23, 2007.

(30) Foreign Application Priority Data

Mar. 25, 2006 (DE) ....................... 10 2006 013 844

(51) Int. Cl.
*B23Q 3/00* (2006.01)
*B25B 11/00* (2006.01)

(52) U.S. Cl. ........................... 156/538; 269/20; 269/21; 156/DIG. 31; 156/DIG. 33; 156/DIG. 37; 156/DIG. 39

(58) Field of Classification Search ................... 269/20, 269/21; 156/538, DIG. 31, DIG. 33, DIG. 37, 156/DIG. 39
See application file for complete search history.

(56) References Cited

U.S. PATENT DOCUMENTS 4,647,333 A * 3/1987 Voltmer et al. .............. 156/351
4,758,300 A * 7/1988 King et al. .................. 156/357
6,883,576 B1 * 4/2005 Rello et al. ................. 156/556

FOREIGN PATENT DOCUMENTS

WO WO 96/15943 5/1996
WO WO 01/17858 3/2001

OTHER PUBLICATIONS

International Search Report PCT/EP2007/002579 and English translation thereof.
International Preliminary Report on Patentability PCT/EP2007/002579 and English translation thereof.

* cited by examiner

*Primary Examiner*—Kat Wyrozebski
*Assistant Examiner*—Carson Gross
(74) *Attorney, Agent, or Firm*—Nils H. Ljungman & Associates

(57) ABSTRACT

A labeling machine, a vacuum drum for use in a labeling machine, and a method of using a labeling machine having a vacuum drum. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading “Abstract of the Disclosure.” The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 7 Drawing Sheets

LABELING MACHINE, A VACUUM DRUM FOR USE IN A LABELING MACHINE, AND A METHOD OF USING A LABELING MACHINE HAVING A VACUUM DRUM

CONTINUING APPLICATION DATA

This application is a Continuation-In-Part application of International Patent Application No. PCT/EP2007/002579, filed on Mar. 23, 2007, which claims priority from Federal Republic of Germany Patent Application No. 10 2006 013 844.9, filed on Mar. 25, 2006. International Patent Application No. PCT/EP2007/002579 was pending as of the filing date of this application. The United States was an elected state in International Patent Application No. PCT/EP2007/002579.

BACKGROUND

1. Technical Field

This present application relates to a vacuum drum for use on labeling machines and on labeling machines for a wraparound labeling process, and to a labeling machine with such a vacuum drum.

2. Background Information

Background information is for informational purposes only and does not necessarily admit that subsequently mentioned information and publications are prior art.

Vacuum drums for use on labeling machines, for example on labeling machines that are realized to perform wraparound labeling, are described in the prior art. Basically, such vacuum drums are used for, among other things, applying the labels with a forward or leading end of the label (edge or side of the label) in the direction of rotation or revolution of the vacuum drum to the respective container as the container is moved past the labeling unit, whereby the label is then completely applied to the container, e.g. by rotating the container around its vertical container axis as the label is removed from the vacuum drum. The labels are each held on the vacuum drum by their leading label end or by a rear or trailing label end on a vacuum holder or vacuum pad. The distance between the corresponding vacuum holders for the leading label end and the rear or trailing label end on the peripheral surface of the vacuum drum, which is generally in the form of a circular cylinder, is thus essentially equal to the length of the labels to be processed. On the periphery of some vacuum drums, there is a plurality of vacuum holders for the forward end of the label, each with a corresponding vacuum holder for the trailing end of the label, so that a plurality of individual labels can be transferred to a plurality of respective containers during one full revolution of the vacuum drum.

For wraparound labeling, in which the labels completely surround the container in the area to be labeled and for this purpose are applied with the two ends of the label overlapping, one problem is that containers with different diameters in the area to be labeled or with different formats may use labels of different lengths. Consequently, the vacuum holders corresponding to each other for the leading end of the label and the trailing end of the label should be at a correspondingly different distance from each other on the periphery of the vacuum drum for the labeling of containers that have a different diameter.

For the conversion of labeling machines from labels of one length to labels of another length, e.g. when there is a change of format, it has therefore been desired up to now to replace the vacuum drum that was in use prior to a format change with a vacuum drum that is appropriate for the new label format.

Simply on account of the significant weight of such vacuum drums, this process may require complicated handling and the expenditure of significant force. A suitable vacuum drum may also be available for each format, which also involves a significant amount of technical and mechanical complexity.

OBJECT OR OBJECTS

The object of the present application is to create a vacuum drum which overcomes these disadvantages and makes it possible to change formats quickly and easily. The present application teaches that this object can be accomplished by a vacuum drum for use in a labeling machine, possibly for the labeling of bottles or similar containers, with at least two vacuum holders offset from each other on a peripheral surface of the drum around a drum axis, possibly for a forward end of the label or a trailing end of the label. At least a portion of the peripheral surface is formed by at least one segment, and the distance between the vacuum holders on the periphery of the vacuum drum can be varied by replacing at least one segment. Another object of the present application is a labeling machine for the labeling of bottles or similar containers, having at least one labeling unit and at least one vacuum drum which is driven in rotation, using the vacuum drum.

SUMMARY

The vacuum drum according to at least one possible embodiment of the present application makes it possible to change formats simply by replacing one or more segments. These segments can be realized in the shape of a ring or a partial ring that weighs significantly less than a complete vacuum drum which, among other things, significantly facilitates handling operations during format changes and maintenance.

In one embodiment of the present application, the vacuum drum is realized in the form of a hollow drum with a wall that forms the peripheral surface of the drum. The segment is then a part of this wall. The peripheral surface of the drum is often formed by a plurality of interchangeable segments, so that by using a vacuum drum with a different number of individually selected segments and/or with segments of different sizes or equipping a vacuum drum with a different number of individually selected segments and/or segments of different sizes it becomes possible to adjust the distance between the vacuum holders for the leading end of the labels and the training end of the labels, i.e. to adjust the distance to the respective label format easily and generally without problems. It is also possible to achieve an optimum utilization of the peripheral surface of the vacuum drum so that it holds as many labels as possible on the periphery, for example, at a specified label application rate of a labeling machine, to achieve the slowest possible peripheral speed for the vacuum drum driven in rotation, or at a specified peripheral speed of the vacuum speed to achieve the highest possible label application rate.

The segments used are each placed on a support (segment support), where they can be centered by a contour, for example, and to which they are fixed in a suitable manner. By means of at least one flow channel that is realized in the support, a vacuum is applied to the vacuum holders (vacuum pads) on the support, and are optionally supplied with a controlled quantity of compressed air for the transfer of the individual label to the container.

The present application describes two basic configurations, although many other configurations are likewise possible. In one of these configurations, at least one replaceable segment is used, for example, as a spacer or spacers between the two vacuum holders that correspond to one another, i.e. when there is a change of the distance between these vacuum holders, the segment that is currently being used is replaced by a segment that corresponds to the modified distance. For this purpose, at least one of the two vacuum holders is correspondingly repositioned on the vacuum drum or on the support of this vacuum drum.

In another basic configuration, there is at least one vacuum holder on the segment, i.e. fastened to the segment or part of the segment. Thus, to change the distance between vacuum holders, the vacuum holder is replaced together with the segment.

Any gaps that may result from the replacement of the at least one segment on the periphery of the vacuum holder are filled by one or more additional segments, if and to the extent that such a measure is desirable.

In other words and in accordance with at least one possible embodiment, the peripheral side of the vacuum drum is made up of one or more segments. At least one of the segments is a vacuum holder segment which is utilized to hold the labels on the vacuum drum by a vacuum suction force. At least one of the other segments is a spacer or closing segment which fills in or closes the gap or gaps between the vacuum holder segments so that the vacuum drum has a continuous uninterrupted peripheral side. The vacuum holder segments may be of different size in order to accommodate labels of different size. The spacer or closing segments will accordingly be of different sizes which correspond to the different sizes of the vacuum holder segments. In at least one possible embodiment, the vacuum holder segments are joined to or are integral with the spacer or closing segments. In such an embodiment, when a new label of a different size is to be handled by the vacuum drum, the vacuum holder segments and the spacer or closing segments currently in the vacuum drum are removed simultaneously or substantially simultaneously, and then new vacuum holder segments and their corresponding spacer or closing segments are inserted simultaneously or substantially simultaneously.

The above-discussed embodiments of the present invention will be described further herein below. When the word “invention” or “embodiment of the invention” is used in this specification, the word “invention” or “embodiment of the invention” includes “inventions” or “embodiments of the invention”, that is the plural of “invention” or “embodiment of the invention”. By stating “invention” or “embodiment of the invention”, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Developments of the present application are described in the dependent claims. The present application is explained in greater detail below with reference to the accompanying drawings, which show one exemplary embodiment of the present application, and in which:

DESCRIPTION OF EMBODIMENT OR EMBODIMENTS

Figure 1:
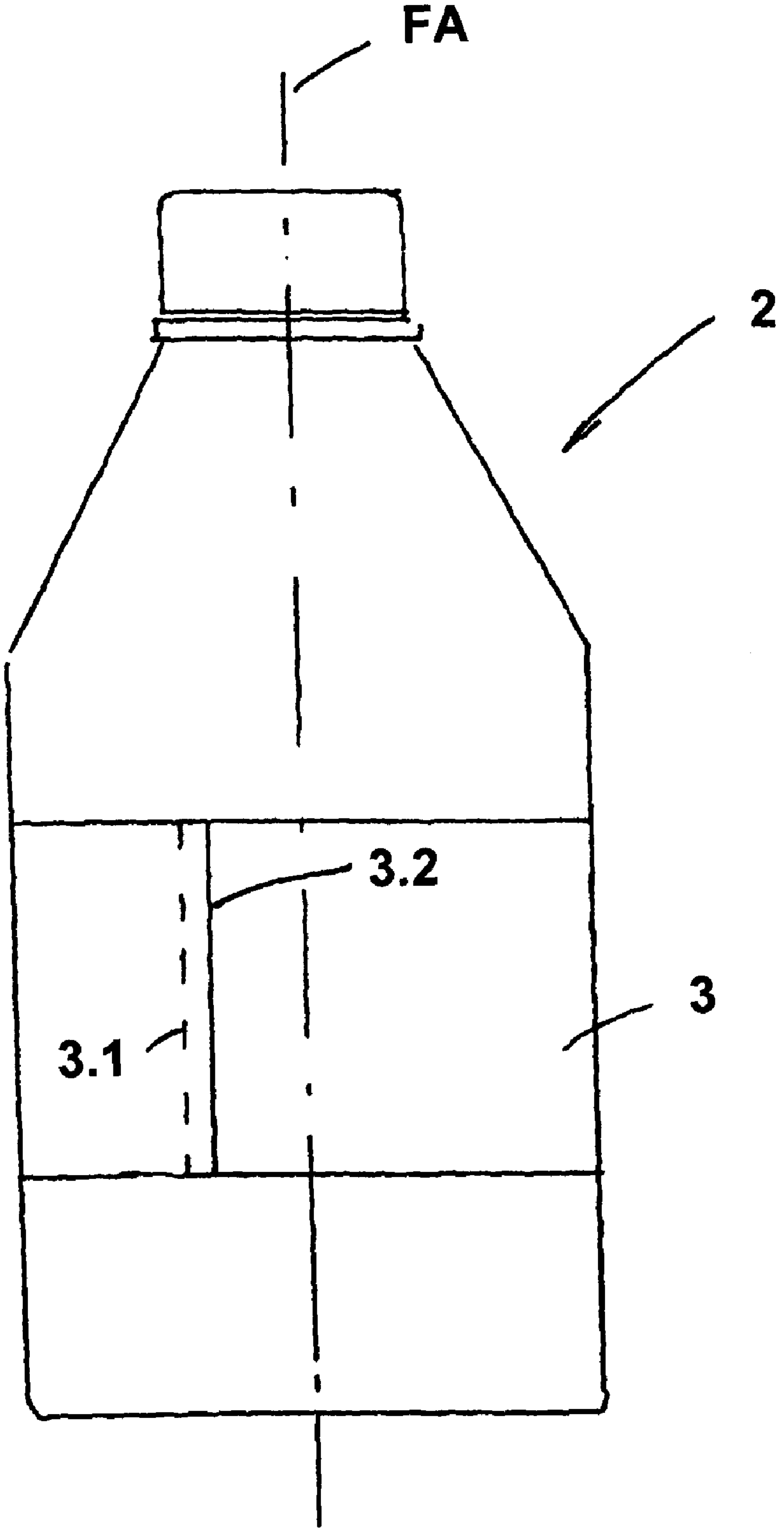
FIG. 1 shows a container in the form of a bottle with a wraparound label.
Figure 2:
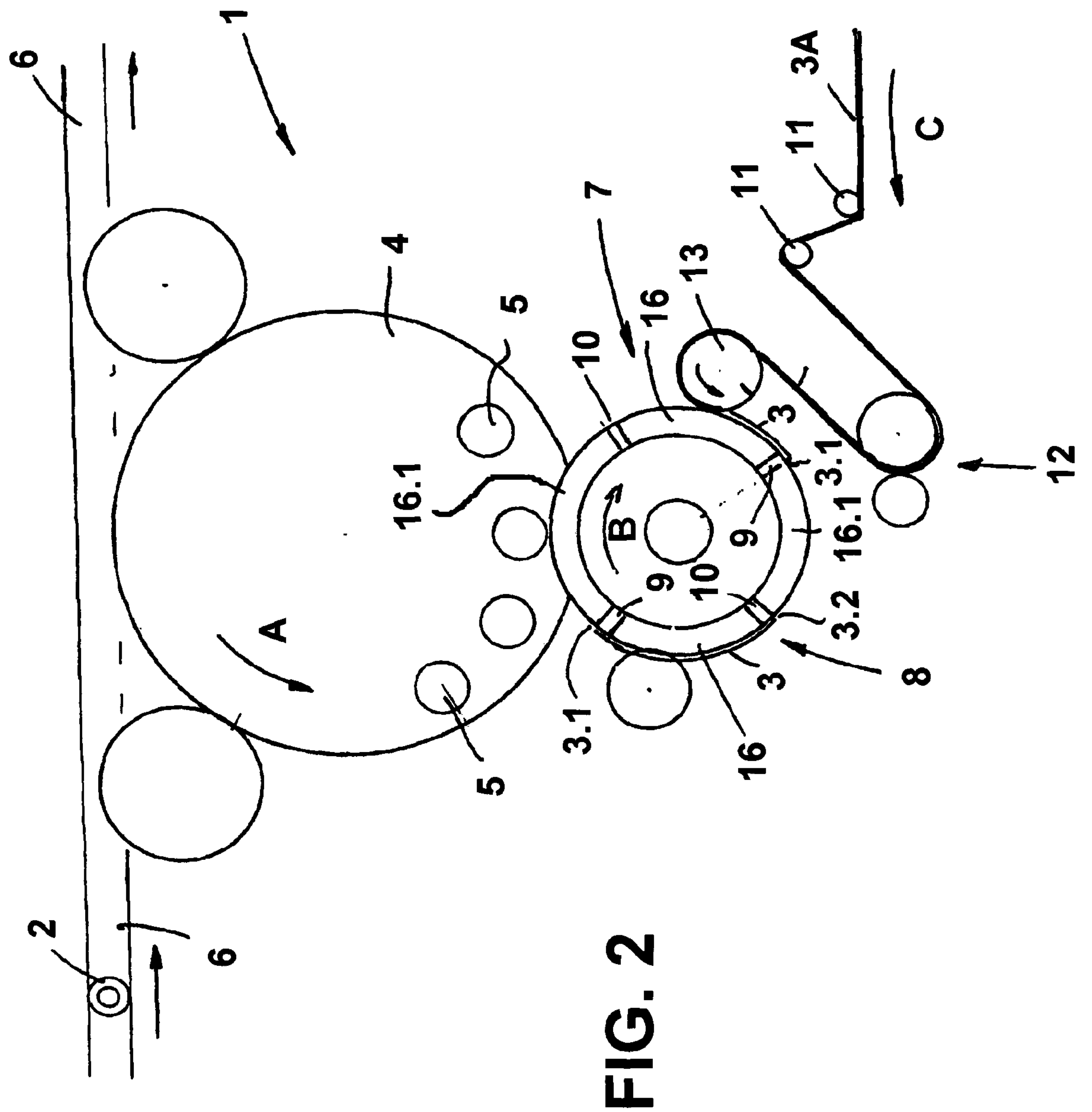
FIG. 2 is a schematic diagram showing an overhead view of a portion of the labeling unit of a labeling machine for wraparound labeling.

FIG. 1 shows a labeling machine in the form of a rotary machine for the wraparound labeling of bottles 2, i.e. for the application of wraparound labels 3 on bottles 2. The labeling machine 1 used for this purpose comprises in the manner described in the prior art a rotor 4 that is driven in rotation in the direction indicated by the arrow A around a vertical machine axis with a plurality of support surfaces that are formed on the periphery of the rotor and formed by turntables 5. The bottles 2 to be labeled are fed to the rotor 5 via a conveyor 6 at a bottle inlet so that one bottle 2 is standing upright on each turntable 5, i.e. with its bottle axis FA oriented in the vertical direction. With the rotor 4, the bottles 2 are moved past a labeling unit 7, on which each label 3, which is coated with glue on its reverse side and held on the periphery of a vacuum drum 8, is transferred by its leading label end 3.1 to the bottle 2 which is moving past and is then applied in the form of a wraparound label to the surface of the bottle 2 by winding while the bottle 2 rotates and the label is pulled off the vacuum drum 8 onto the bottle 2. The labeled bottles 2 are transferred to a container or bottle outlet and to the conveyor 6 to be removed from the labeling unit.

To hold the labels 3 on the cylindrical peripheral surface of the vacuum drum 8, which is driven around a vertical axis in synchronization with the rotor 4, but in the opposite direction of rotation, i.e. in the direction indicated by the arrow B, there are vacuum holders 9 and 10, i.e. devices which can also be called vacuum pads, and namely one vacuum holder 9 each for holding a label 3 on its leading label end 3.1 and a vacuum holder 10 for holding each label on the trailing label end 3.2. The vacuum holders 9 and 10 are provided in pairs, and specifically in a an arc distance which is equal to the length of a label 3 and thus for wraparound labeling. in which the labels 3 are applied with overlapping ends 3.1 and 3.2, are somewhat larger than the circumference of the bottles 2 in their area to be labeled.

In the illustrated embodiment, the labels 3 are created by separating them from a strip-format label material 3*a* which is extracted from a supply mechanism (storage spool, not shown) in the direction indicated by the arrow C. For this purpose the label material 3*a* is fed to the labeling unit 7 via a plurality of rollers and a motor-driven extraction device 12 and arrives at a cutting roller 13 on which the length that forms the individual label 3 is separated from the label material 3*a* and transferred to the vacuum drum 8. Held by the vacuum holder 9 on the vacuum drum 9, each label 3 is then moved past a gluing station 14 for the application of the glue.

As indicated above, the distance between the forward vacuum pad and the corresponding rear vacuum pad 10 is a function of the length of the labels 3 and this length is in turn a function of the diameter of the bottles 2 in the area in which they are to be provided with the wraparound label.

To change formats, i.e. to convert from one type of bottle or container to another type of bottle or container that has a larger or smaller diameter, and which thus could require a conversion to longer or shorter labels 3, it has up to now been desirable to completely replace the current vacuum drum with another vacuum drum that fits the new format, on which the distance between the corresponding vacuum pads 9 and 10 in turn corresponds to the length of the labels 3 used after the conversion, which is a process that has the disadvantages cited above, among others.

Figure 3:
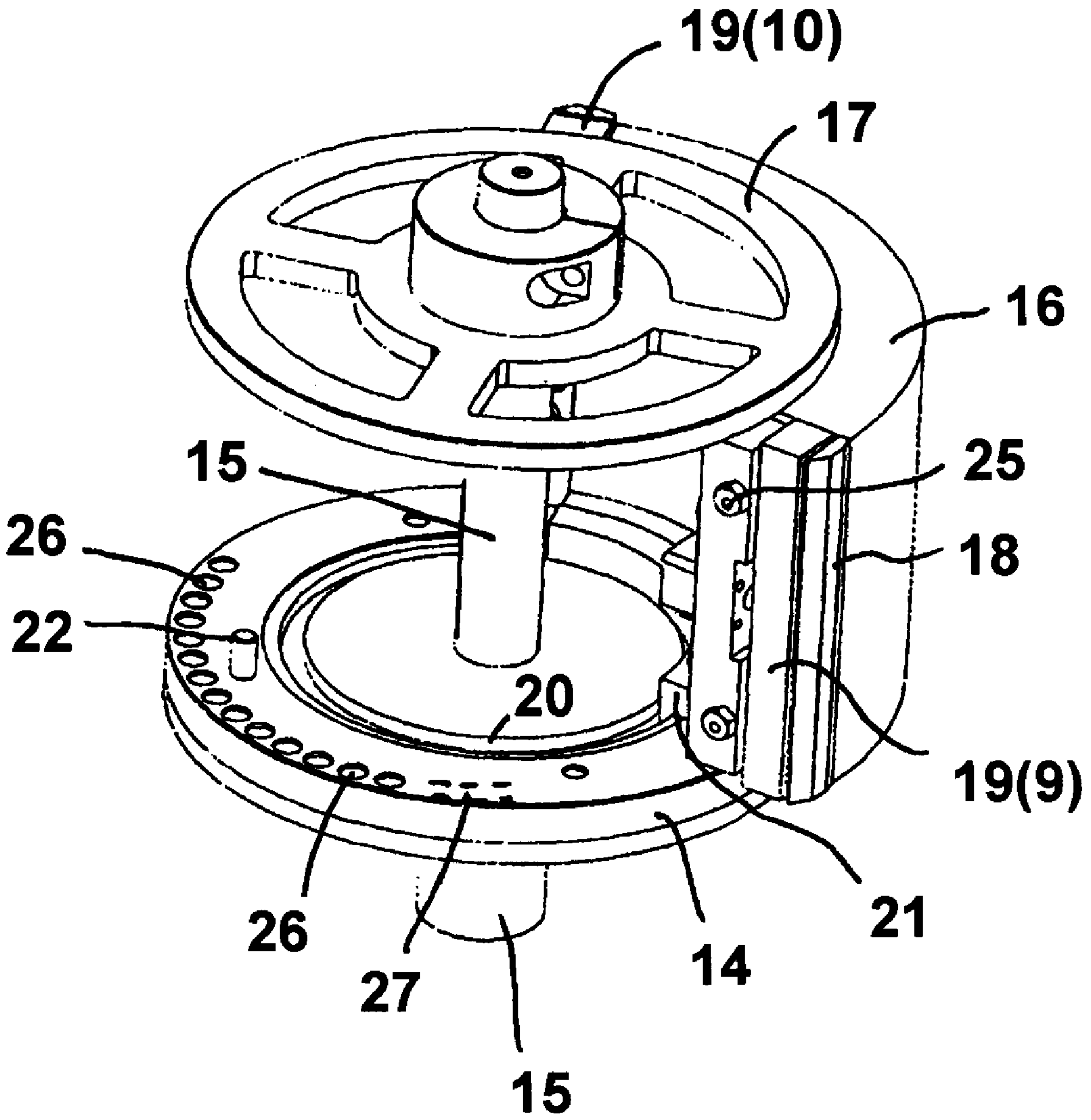
FIGS. 3 and 4 show, in different partial views in perspective, the elements of a vacuum drum of the labeling unit illustrated in FIG. 2.
Figure 4:
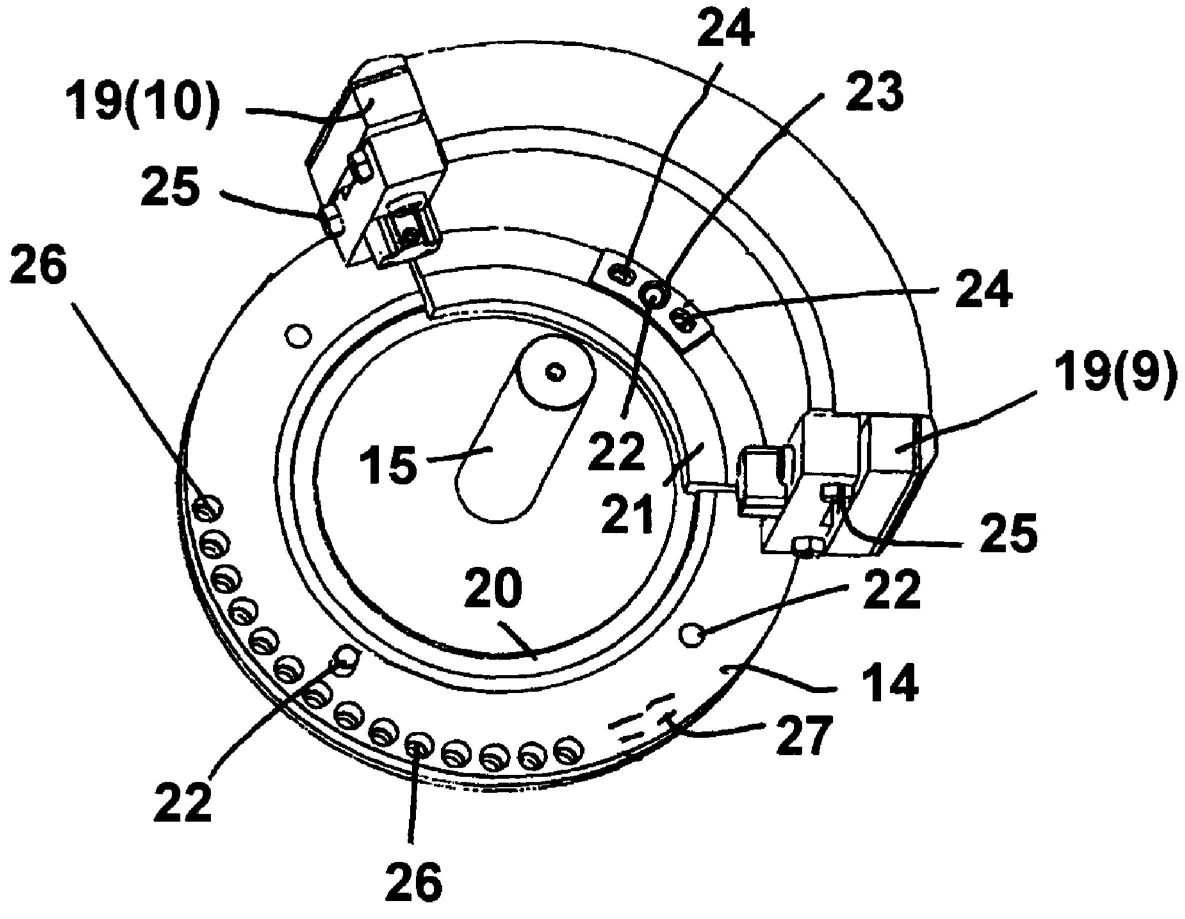

To overcome these disadvantages, the vacuum drum 8 is realized in multiple parts as illustrated in FIGS. 3 and 4. It comprises a lower support 14 in the form of a plate or partial circular disc which is provided on the vertical shaft 15 that drives the vacuum drum 8, a plurality of segments that form the peripheral or drum surface of the vacuum drum 8, as identified by 16 and 16.1 in the figures, and a circular disc-shaped cover 17 that forms the upper side of the vacuum drum 8 and is held on the upper end of the shaft 15, e.g. by clamps. In at least one possible embodiment, the segments 16 and 16.1 have the same curvature on their outer surfaces to form a cylindrical or substantially cylindrical outer wall of the vacuum drum 8 upon installation.

The segment 16 is provided on both sides with a slot-shaped nozzle body 19 which forms a nozzle 18 that runs parallel or virtually parallel to the shaft 15, whereby the one nozzle body 19. with its nozzle slot 18, forms the vacuum holder 9, and the other nozzle body 19, with its nozzle slot 18, forms the vacuum holder 10. By means of a ring-shaped profile 20 on the upper side of the support 14, and by means of a ring-shaped flange 21 on the segment 16 that grips this profile 20 in a form-fitting manner, the vacuum holder 10 is held in a form-fitting manner on the support 14 to overcome the centrifugal forces that are exerted in a radial direction in relation to the axis of the shaft 1. The individual segment 16 is centered and positioned on the support 14 by means of additional centering elements in the form of studs 22 on the support 14 and corresponding openings 23 in the flange 21 for the studs 22. By means of slots 24 in the flange 21 and by means of screws or bolts (not shown) which run through these slots 24, it is possible to position the respective segment 16 in the peripheral direction of the vacuum drum 8. Each segment 16 is secured to the top of the vacuum drum 8 by the form-fitting engagement of the segment and of the cover 17.

In the embodiment illustrated in FIGS. 3 and 4, the support 14 is realized so that it holds two segments 16 with the two nozzle elements 19, each of which is held by a threaded fastener 25. Between these two segments 16, the peripheral surface of the vacuum drum 8 is made larger or smaller by two segments or spacer segments 16.1, which are held in the same manner as the segments 16 on the support 14 and on the cover 17.

At the places where the segments 16 are provided, on the upper side of the support 14, in the vicinity of the periphery of the support, a plurality of openings 26 are provided which, when the segment 16 is assembled, create a flow connection between a flow channel 27 for vacuum and optionally compressed air and a duct that is realized in the respective nozzle element 19 and is in communication with the nozzle opening 18. The openings 26 that are not used are then covered and closed tight by the segments 16 and 16.1 and by the respective flange segment 21 of these segments 16 and 16.1 respectively. With the construction described above, it is possible to equip the vacuum drum 8, as a function of the diameter of the containers or bottles 2 to be labeled and thus as a function of the length of the labels used 3, with a different number and/or size of segments 16 and 16.1 to adapt the vacuum drum 8 to the current format quickly and easily. This adaptation can be made up optimally utilizing the specified periphery of the vacuum drum 8, i.e. by providing as many vacuum pad pairs as possible, each of which is formed by a vacuum holder 9 and a vacuum holder 10, in the distance dictated by the length of the labels 3, so that during each revolution of the vacuum drum 8, as many labels 3 as possible can be transferred during each revolution of the vacuum drum 8 to the bottles 2 moved past the labeling unit 7.

Figure 3A:
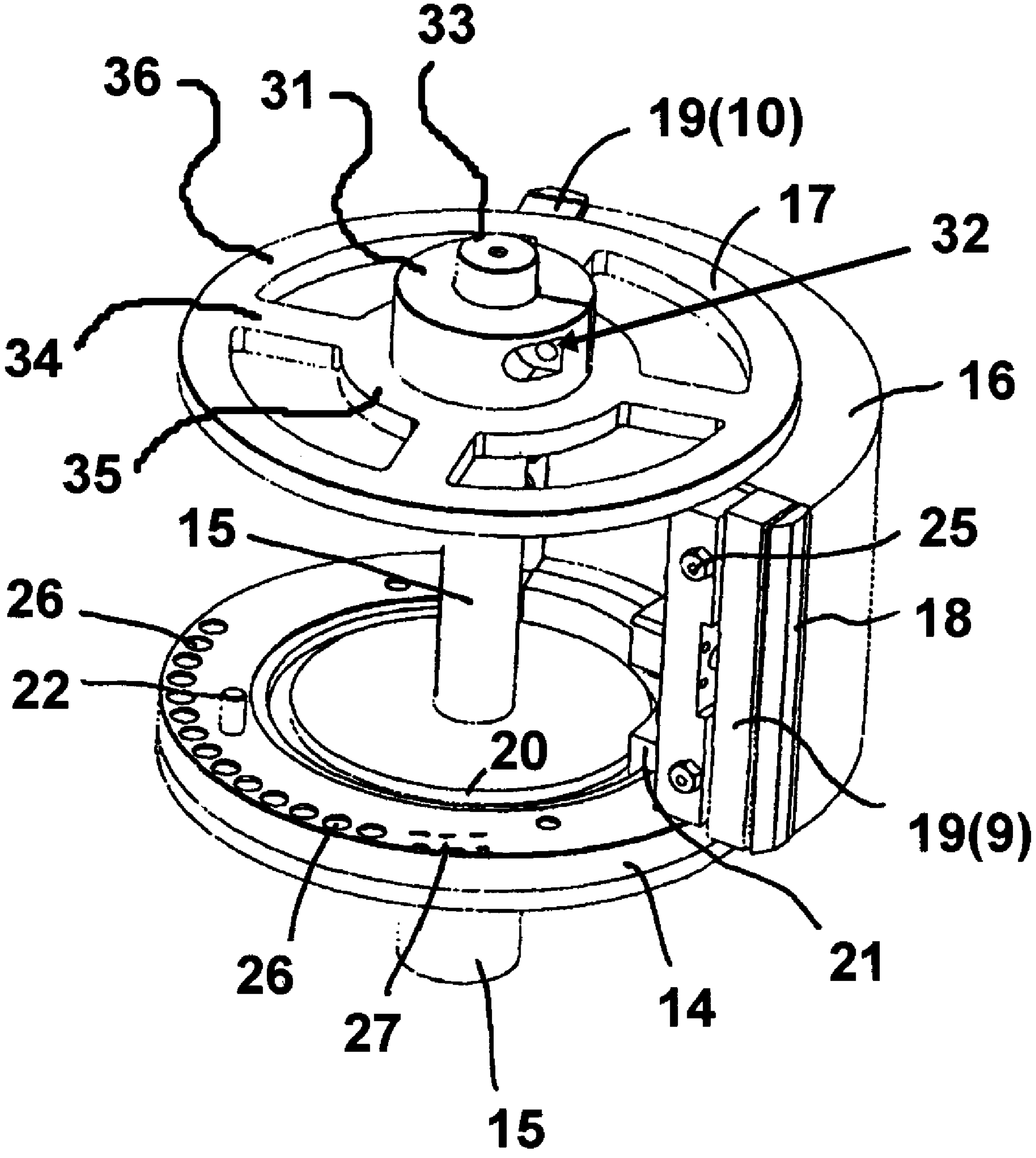
FIGS. 3A and 4A show additional views of the embodiments shown in FIGS. 3 and 4, respectively, with additional numbering for further features.
Figure 4A:
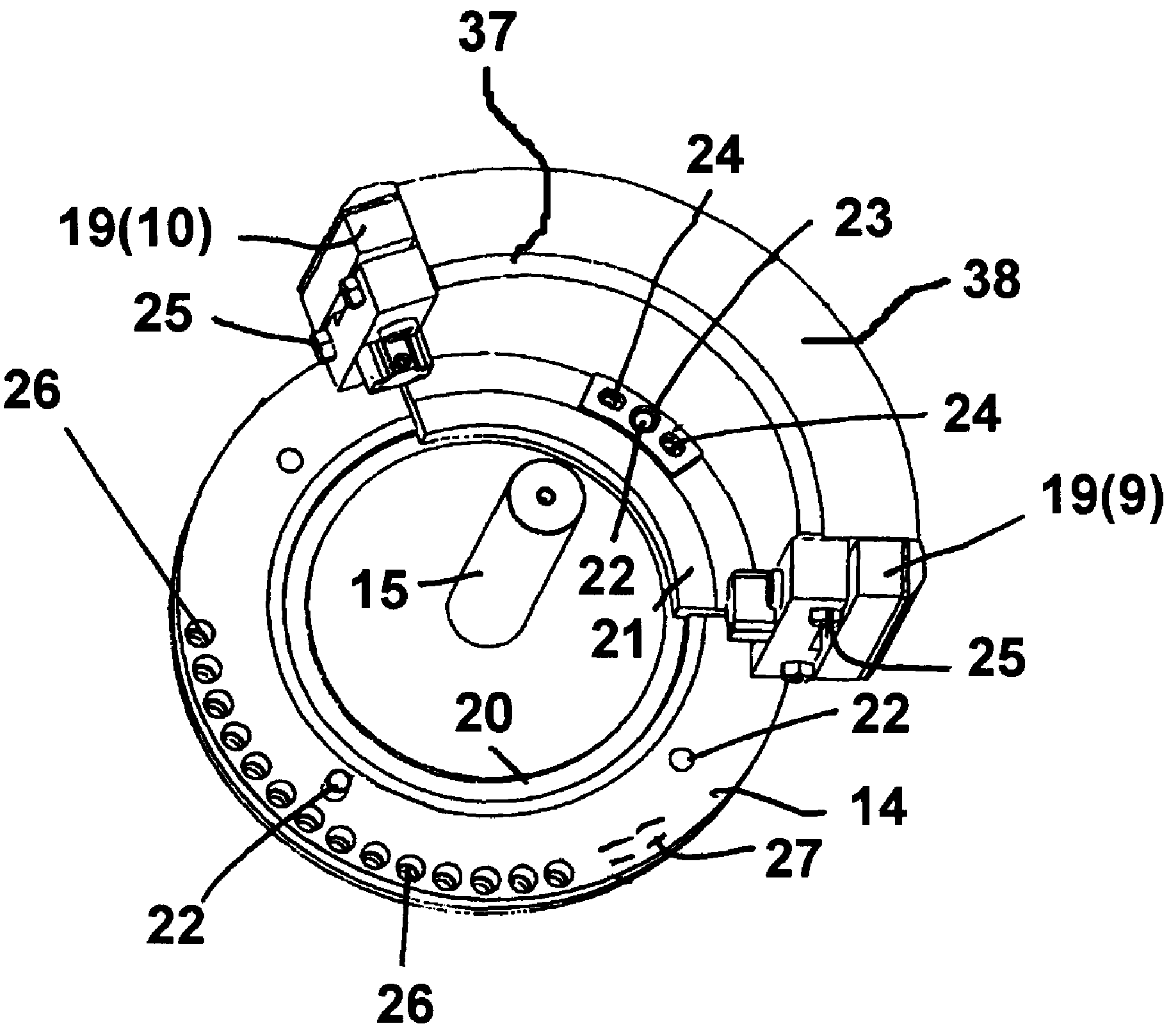

FIGS. 3A and 4A show additional views of the embodiments shown in FIGS. 3 and 4, respectively, with additional numbering for further features. Specifically, the upper portion 33 of the shaft 15 of the vacuum drum 8 is surrounded in part by a removable C-shaped clamping arrangement 31. The removable clamping arrangement 31 is clamped together by a screw or bolt 32. The clamping arrangement 31 securely clamps or braces the cover 17 against an inner portion 37 of the segments 16, which can be seen in FIG. 4A. In at least one possible embodiment, the clamping arrangement 31 may be separate from the cover 17 or may be integral with the cover 17. The inner portion 37 is slightly recessed with respect to the outer portion 38 of the segments 16 in a step-like manner, thereby forming a shoulder or ledge which is contacted and clamped by the cover 17 to further secure and hold the segments 16 and 16.1 in place. The cover 17, which could be in the shape of a wheel or disc, serves to securely hold the segments 16 and 16.1 in place to promote accurate labeling of the bottles or containers. In the embodiment shown in FIG. 3A, the cover 17 has a wheel design with an outer ring portion 36, an inner ring portion 35, and spokes 34 which join the outer ring portion 36 and the inner ring portion 35. When one or more of the segments 16 are to be replaced, the screw 32 is loosened and the clamping arrangement 31 is removed from the upper portion 33 of the shaft 15, which allows for removal of the cover 17. Once the new segments 16 and 16.1 are installed, the cover 17 is placed back on the shaft 15 with the outer peripheral edge of the cover 17 resting against the inner portion 37 of the segments 16 and 16.1. The clamping arrangement 31 is then also placed back over the shaft 15 and is secured to the shaft 15 by the screw or bolt 32, thereby clamping the cover 17 against the segments 16 and 16.1, and thereby further securing the segments 16 and 16.1 in place in the vacuum drum 8. The increased clamping force and stabilizing effect of such an arrangement compensates for the forces exerted on the vacuum drum 8 during operation, thereby maintaining the segments 16 and 16.1 in an aligned position and promoting a more accurate and precise labeling of the bottles or containers.

Figure 5:
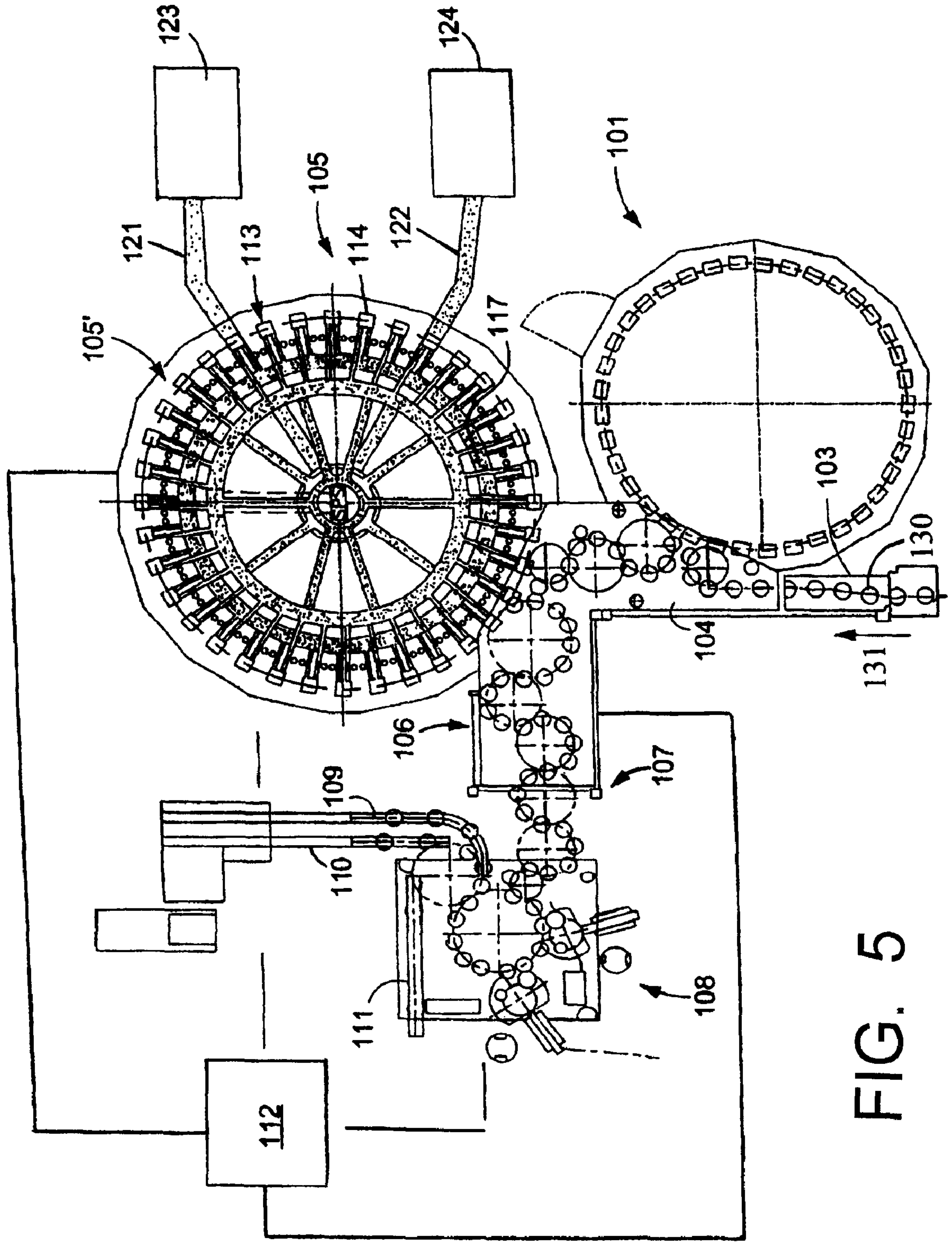
FIG. 5 shows an example of a beverage bottling or container filling plant in which at least one possible embodiment of the vacuum drum could be used.

FIG. 5 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 5, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The present application is described above with reference to at least one exemplary embodiment. It goes without saying that modifications or variations are possible without thereby going beyond the teaching of the present application.

On a vacuum drum for use in a labeling machine with at least two vacuum holders which are offset from one another around a drum axis on a peripheral surface of the drum for a leading and a trailing end of a label, making it possible to adapt the drum to levels of a different length, the distance between the vacuum holders can be varied by replacing at least one segment that forms at least a portion of the peripheral surface.

One feature or aspect of an embodiment is believed at the time of the filing of this patent application to possibly reside broadly in a vacuum drum for use in a labeling machine, possibly for the labeling of bottles or similar containers 2, with at least two vacuum holders 9, 10 offset from each other on a peripheral surface of the drum 8 around a drum axis 15, in particular for a forward end 3.1 of the label or a trailing end 3.2 of the label, wherein, at least a portion of the peripheral surface is formed by at least one segment 16, 16.1, and the distance between the at least two vacuum holders 9, 10 on the periphery of the vacuum drum 8 can be varied by replacing at least one segment 16, 16.1.

Another feature or aspect of an embodiment is believed at the time of the filing of this patent application to possibly reside broadly in the vacuum drum, wherein the position of at least one vacuum pad 9, 10 can be varied in the peripheral direction of the vacuum drum 8.

Yet another feature or aspect of an embodiment is believed at the time of the filing of this patent application to possibly reside broadly in the vacuum drum, wherein at least one vacuum holder 9, 10 is provided on the at least one interchangeable segment 16 or is a part of the at least one replaceable segment 16.

Still another feature or aspect of an embodiment is believed at the time of the filing of this patent application to possibly reside broadly in the vacuum drum, wherein, there is at least one vacuum holder 9, 10 on the at least one replaceable segment 16 on at least one end, preferably on two ends that are offset from each other in the peripheral direction of the vacuum drum.

A further feature or aspect of an embodiment is believed at the time of the filing of this patent application to possibly reside broadly in the vacuum drum, wherein the peripheral surface of the vacuum drum 8 is formed by at least one replaceable ring-shaped segment.

Another feature or aspect of an embodiment is believed at the time of the filing of this patent application to possibly reside broadly in the vacuum drum, wherein the peripheral surface of the vacuum drum 8 is formed by at least one interchangeable ring-shaped segment 16, 16.1.

Yet another feature or aspect of an embodiment is believed at the time of the filing of this patent application to possibly reside broadly in the vacuum drum, wherein the peripheral surface of the vacuum drum 8 is formed by a plurality of interchangeable segments 16, 16' that can be connected with one another.

Still another feature or aspect of an embodiment is believed at the time of the filing of this patent application to possibly reside broadly in the vacuum drum, wherein the vacuum drum is realized in the form of a hollow drum with a peripheral drum wall in the shape of a ring or a hollow cylinder.

A further feature or aspect of an embodiment is believed at the time of the filing of this patent application to possibly reside broadly in the vacuum drum, wherein at least one replaceable segment 16, 16.1 in the shape of a ring or partial ring forms at least a part of the peripheral wall of the drum in the shape of a hollow cylinder.

Another feature or aspect of an embodiment is believed at the time of the filing of this patent application to possibly reside broadly in the vacuum drum, wherein the vacuum comprises a support 14 on which the at least one segment 16, 16.1 is detachably held.

Yet another feature or aspect of an embodiment is believed at the time of the filing of this patent application to possibly reside broadly in the vacuum drum, wherein the support 14 is realized in the form of a plate or disc and forms one end surface of the vacuum drum 8, the at least one segment 16, 16' is fastened to the support 14 such that the axis of curvature of the at least one part of the external surface of the segment 16, 16.1 that forms the peripheral surface of the vacuum drum 8 extends in the same axial direction or in essentially the same axial direction as the axis of the support 14.

Another feature or aspect of an embodiment is believed at the time of the filing of this patent application to possibly reside broadly in the vacuum drum, wherein the support 14 is provided on a shaft 15 which is oriented in the same axial direction as the axis of the support 14, and a cover 17 is fastened to the shaft 15, on which over at least one segment 16, 16.1 is held on a side facing away from the support 14.

Yet another feature or aspect of an embodiment is believed at the time of the filing of this patent application to possibly reside broadly in the vacuum drum, wherein the vacuum drum further comprises a stud opening 22, 23 for the centering of the at least one segment 16, 16.1 on the support 14.

Still another feature or aspect of an embodiment is believed at the time of the filing of this patent application to possibly reside broadly in the vacuum drum, wherein at least one flow channel is provided in the support 14, and on a surface of the support 14 that is provided for the fastening of the at least one segment 16, 16.1, there is at least one connection opening 26 emptying into the flow channel 27 to connect the vacuum holder 9, 10 with the flow channel 27.

A further feature or aspect of an embodiment is believed at the time of the filing of this patent application to possibly reside broadly in the vacuum drum, wherein a plurality of connection openings 26 are provided, and after the fastening of the at least one segment 16, 16.1, the unneeded connection openings 26 are closed by this segment 16, 16.1.

Another feature or aspect of an embodiment is believed at the time of the filing of this patent application to possibly reside broadly in a labeling machine for the labeling of bottles or similar containers 2 with at least one labeling unit 7 with at least one vacuum drum 8 which is driven in rotation, wherein the drum is realized as the vacuum drum.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Sep. 10, 2007, and/or cited elsewhere are hereby incorporated by reference as if set forth in their entirety herein as follows: U.S. Pat. No. 6,883,576, issued on Apr. 26, 2005, with the title "Quick Change Roll-Fed High Speed Labeling System and Methods for Using Same;" WO 01/17858, published on Mar. 15, 2001, with the title "Lightweight Vacuum Drum;" and WO 96/15943, published on May 30, 1996, with the title "Method and Apparatus for Wrapping Cylindrical Articles with Hot Melt Adhesive Backed Label."

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 013 844.9, filed on Mar. 25, 2006, having inventor Klaus KRÄMER, and DE-OS 10 2006 013 844.9 and DE-PS 10 2006 013 844.9, and International Application No. PCT/EP2007/002579, filed on Mar. 23, 2007, having WIPO Publication No. WO 2007/110199 and inventor Klaus KRÄMER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/002579 and German Patent Application 10 2006 013 844.9 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/002579 and 10 2006 013 844.9 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The purpose of incorporating U.S. patents, Foreign patents, publications, etc. is solely to provide additional information relating to features of one or more embodiments, which information may not be completely disclosed in the wording in the pages of this application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Labeling machine
2 Bottle
3, 3*a* Label
3.1 Leading end of label
3.2 Trailing end of label
4 Rotor
5 Turntable
6 Conveyor
7 Labeling unit
8 Vacuum drum
9, 10 Vacuum holder or vacuum pad
11 Roller
12 Take-off device
13 Cutting roller
14 Support
15 Shaft of vacuum drum 8
16, 16.1 Segment
17 Cover
18 Nozzle slot
19 Nozzle element
20 Profile
21 Flange
22 Centering stud
23 Stud opening
24 Slot
25 Threaded fastener
26 Opening or outlet
A Direction of rotation of the rotor 4
B Direction of rotation of the vacuum drum 8
C Extraction direction of the label material 3*a*
FA Bottle axis

What is claimed is:

1. A rotary labeling machine kit configured to label bottles or containers with labels of different sizes upon assembly, said labeling machine kit comprising:

a rotor comprising a plurality of bottle or container supports disposed on and about the periphery thereof;

a rotary labeling unit being disposed adjacent said rotor and being configured to apply labels onto bottles or containers supported on said supports of said rotor;

a storage arrangement being configured and disposed to store a supply of labels having different lengths;

a label transport arrangement being configured and disposed to transport labels from said storage arrangement to said rotary labeling unit;

said rotary labeling unit comprising a vacuum drum;

said vacuum drum comprising: a circular upper cover portion, a circular lower support portion, and a central rotatable shaft;

said central rotatable shaft being disposed to pass coaxially through said upper cover portion upon assembly and said lower support portion;

a plurality of interchangeable, arcuate, vacuum holder segments, each being configured to be removably attached to said lower support portion to form a portion of a peripheral side wall of said vacuum drum, and each being configured to be removed from said vacuum drum to permit insertion of another vacuum holder segment;

a plurality of interchangeable, arcuate, spacer segments, each being configured to be removably attached to said lower support portion to form a portion of a peripheral side wall of said vacuum drum, and each being configured to be removed from said vacuum drum to permit insertion of another spacer segment;

each of said spacer segments being configured to be disposed between adjacent vacuum holder segments to fill in gaps between adjacent vacuum holder segments to form a continuous peripheral side wall of said vacuum drum;

each of said vacuum holder segments comprising an inner curved portion and an outer curved portion;

said inner curved portion being shorter in height than said outer curved portion to form a shoulder in a top portion of its corresponding vacuum holder segment;

said upper cover portion comprising: an outer ring portion, an inner ring portion, and a plurality of spokes connecting said outer ring portion and said inner ring portion;

said outer ring portion being configured to be disposed to contact said shoulders of said vacuum holder segments across at least substantially the entire length thereof to clamp said vacuum holder segments between said upper cover portion and said lower support portion;

a C-shaped clamping arrangement being configured to surround an upper portion of said shaft and to press and clamp said upper cover portion against said shoulders of said vacuum holders segments;

each of said vacuum holder segments comprising a first, leading vacuum device and a second, trailing vacuum device being disposed at opposite ends of said vacuum holder segment;

said first, leading vacuum device being disposed to precede said second, trailing vacuum device in the direction of rotation of said vacuum drum;

said first, leading vacuum device being configured and disposed to hold a first end of a label, and said second, trailing vacuum device being configured and disposed to hold a second end of the label opposite the first end;

said lower support portion comprising a plurality of vacuum holes;

each of said plurality of vacuum holder segments comprising an interior vacuum passage being configured to connect said vacuum devices to said vacuum holes upon attachment of said vacuum holder segment to said lower support portion;

each of said plurality of vacuum holder segments has a length which corresponds to a length of a label to be handled by said vacuum holder segment;

said vacuum holder segments comprising at least a first set of vacuum holder segments and a second set of vacuum holder segments, wherein the length of the vacuum holder segments of said first set is different than the length of the vacuum holder segments of said second set;

said spacer segments comprising at least a first set of spacer segments corresponding to said first set of vacuum holder segments, and a second set of spacer segments corresponding to said second set of vacuum holder segments; and said first set of vacuum holder segments being interchangeable with said second set of vacuum holder segments to permit adjustment of said vacuum drum to permit handling of labels having a first length and labels having a second, different length by said vacuum drum as desired in a labeling operation.

2. The rotary labeling machine kit according to claim 1, wherein said vacuum holder segments and said spacer segments have the same radius of curvature as said lower support portion, and are configured to be disposed coaxially with said lower support portion upon installation.

3. The rotary labeling machine kit according to claim 2, wherein:

said lower support portion comprises a circular centering groove;

each of said vacuum holder segments and said spacer segments comprises a projecting flange; and said projecting flange of each of said vacuum holder segments and said spacer segments is configured to engage said centering groove of said lower support portion upon installation to center said segments on said lower support portion.

4. The rotary labeling machine kit according to claim 3, wherein:

said lower support portion comprises a plurality of centering studs; and each of said projecting flanges comprises an opening configured to receive one of said centering studs therethrough to further center said segments on said lower support portion.

5. The rotary labeling machine kit according to claim 4, wherein said vacuum holder segments and said spacer segments are disposed, upon installation, to cover and seal any of said vacuum holes not in connection with said vacuum devices.

6. A vacuum drum kit for use in a rotary labeling machine for labeling bottles or containers, said vacuum drum kit comprising:

a circular upper cover portion;

a circular lower support portion;

a central rotatable shaft;

said central rotatable shaft being disposed to pass coaxially through said upper cover portion upon assembly and said lower support portion;

a plurality of interchangeable, arcuate, vacuum holder segments, each being configured to be removably attached to said lower support portion to form a portion of a peripheral side wall of said vacuum drum, and each being configured to be removed from said vacuum drum to permit insertion of another vacuum holder segment;

a plurality of interchangeable, arcuate, spacer segments, each being configured to be removably attached to said lower support portion to form a portion of a peripheral side wall of said vacuum drum, and each being configured to be removed from said vacuum drum to permit insertion of another spacer segment;

each of said spacer segments being configured to be disposed between adjacent vacuum holder segments to fill in gaps between adjacent vacuum holder segments to form a continuous peripheral side wall of said vacuum drum;

each of said vacuum holder segments comprising an inner curved portion and an outer curved portion;

a clamping arrangement being configured to surround an upper portion of said shaft and to press and clamp said upper cover portion against said shoulders of said vacuum holders segments;

each of said vacuum holder segments comprising a first, leading vacuum device and a second, trailing vacuum device being disposed at opposite ends of said vacuum holder segment;

said first, leading vacuum device being disposed to precede said second, trailing vacuum device in the direction of rotation of said vacuum drum;

said first, leading vacuum device being configured and disposed to hold a first end of a label, and said second, trailing vacuum device being configured and disposed to hold a second end of the label opposite the first end;

said lower support portion comprising at least one vacuum passage;

each of said plurality of vacuum holder segments comprising an interior vacuum passage being configured to connect said vacuum devices to said at least one vacuum passage upon attachment of said vacuum holder segment to said lower support portion;

each of said plurality of vacuum holder segments has a length which corresponds to a length of a label to be handled by said vacuum holder segment;

said vacuum holder segments comprising at least a first set of vacuum holder segments and a second set of vacuum holder segments, wherein the length of the vacuum holder segments of said first set is different than the length of the vacuum holder segments of said second set;

said spacer segments comprising at least a first set of spacer segments corresponding to said first set of vacuum holder segments, and a second set of spacer segments corresponding to said second set of vacuum holder segments; and said first set of vacuum holder segments being interchangeable with said second set of vacuum holder segments to permit adjustment of said vacuum drum to permit handling of labels having a first length and labels having a second, different length by said vacuum drum as desired in a labeling operation.

7. The vacuum drum kit according to claim 6, wherein said vacuum holder segments and said spacer segments have the same radius of curvature as said lower support portion, and are configured to be disposed coaxially with said lower support portion upon installation.

8. The vacuum drum kit according to claim 7, wherein:

said lower support portion comprises a circular centering groove;

each of said vacuum holder segments and said spacer segments comprises a projecting flange; and said projecting flange of each of said vacuum holder segments and said spacer segments is configured to engage said centering groove of said lower support portion upon installation to center said segments on said lower support portion.

9. The vacuum drum kit according to claim 8, wherein:

said lower support portion comprises a plurality of centering studs; and each of said projecting flanges comprises an opening configured to receive one of said centering studs therethrough to further center said segments on said lower support portion.

10. The vacuum drum kit according to claim 9, wherein said vacuum holder segments and said spacer segments are disposed, upon installation, to cover and seal any of said vacuum passages not in connection with said vacuum devices.

11. A rotary labeling machine kit configured to label bottles or containers with labels of different sizes upon assembly of said rotary labeling machine kit, said rotary labeling machine kit comprising:

a plurality of interchangeable segment structures, each being configured to be removably attachable to a vacuum drum parts-accepting assembly to form a portion of a peripheral side wall of a vacuum drum rotor, and each of said plurality of interchangeable segment structures being configured to be removable from the vacuum drum rotor to permit insertion of another vacuum holder segment structure, which vacuum drum parts-accepting assembly is configured to rotate about a drum axis;

said plurality of interchangeable segment structures and a vacuum drum parts-accepting assembly being configured to together form a vacuum drum rotor;

each of said plurality of interchangeable segment structures comprising a first portion, a second portion, and a third portion;

said first portion comprising a first, leading, vacuum device being configured to hold a leading edge of a label;

said second portion comprising a second, trailing, vacuum device being configured to hold a trailing edge of a label; and said third portion comprising a structure separating said first, leading, vacuum device and said second, trailing, vacuum device;

said first, leading, vacuum device being configured to be disposed to precede said second, trailing, vacuum device in the direction of rotation of said vacuum drum rotor, upon assembly of a vacuum drum rotor;

each of said plurality of interchangeable segment structures comprises a length along the periphery of a vacuum drum rotor which corresponds to a length of a label to be handled by said interchangeable segment structure;

said plurality of interchangeable segment structures comprising at least a first interchangeable segment structure and a second interchangeable segment structure, wherein the length, along the periphery of a vacuum drum rotor, of the first interchangeable segment structure is different than the length, along the periphery of a vacuum drum rotor, of the second interchangeable segment structure; and said first interchangeable segment structure being interchangeable with said second interchangeable segment structure to permit adjustment of a vacuum drum to permit handling of labels having a first length and labels having a second, different, length.

12. The rotary labeling machine kit according to claim 11, wherein:

said vacuum drum parts-accepting assembly comprises:

a circular upper cover portion;

a circular lower support portion; and a central rotatable shaft;

said central rotatable shaft is configured to pass coaxially through said upper cover portion upon assembly and said lower support portion; and said plurality of interchangeable segment structures have the same radius of curvature as said lower support portion, and are configured to be disposed coaxially with said lower support portion upon installation.

13. The rotary labeling machine kit according to claim 12, wherein:

said lower support portion comprises a circular centering groove;

each of said plurality of interchangeable segment structures comprises a projecting flange; and said projecting flange of each of said plurality of interchangeable segment structures is configured to engage said centering groove of said lower support portion upon installation to center said interchangeable segment structures on said lower support portion.

14. The rotary labeling machine kit according to claim 13, wherein:

said lower support portion comprises a plurality of centering studs; and each of said projecting flanges comprises an opening configured to receive one of said centering studs therethrough to further center said segments on said lower support portion.

15. The rotary labeling machine kit according to claim 14, wherein:

said lower support portion comprises at least one vacuum passage;

each of said first, leading, vacuum devices and each of said second, trailing, vacuum devices comprises an interior vacuum passage being configured to connect said vacuum devices to said at least one vacuum passage upon attachment of each of said plurality of interchangeable segment structures to said lower support portion; and said plurality of interchangeable segment structures are disposed, upon installation, to cover and seal any of said vacuum passages not in connection with said vacuum devices.

16. The rotary labeling machine kit according to claim 15, wherein:

each of said plurality of interchangeable segment structures is configured to be disposed adjacent another interchangeable segment structure to form a continuous peripheral side wall of a vacuum drum rotor;

each of said plurality of interchangeable segment structures comprising an inner curved portion and an outer curved portion;

said inner curved portion being shorter in height than said outer curved portion to form a shoulder in a top portion of its corresponding interchangeable segment structure;

said upper cover portion comprising: an outer ring portion, an inner ring portion, and a plurality of spokes connecting said outer ring portion and said inner ring portion;

said outer ring portion being configured to be disposed to contact said shoulders of said plurality of interchangeable segment structures across at least substantially the entire length thereof to clamp said interchangeable segment structures between said upper cover portion and said lower support portion; and a C-shaped clamping arrangement being configured to surround an upper portion of said shaft and to press and clamp said upper cover portion against said shoulders of said plurality of interchangeable segment structures.

17. The rotary labeling machine kit according to claim 16, wherein said rotary labeling machine kit further comprises:

a rotor comprising a plurality of bottle or container supports disposed on and about the periphery thereof;

a rotary labeling unit being disposed adjacent said rotor and being configured to apply labels onto bottles or containers supported on said supports of said rotor;

a storage arrangement being configured and disposed to store a supply of labels having different lengths; and a label transport arrangement being configured and disposed to transport labels from said storage arrangement to said rotary labeling unit.

18. The rotary labeling machine kit according to claim 17, wherein said first portion, said second portion, and said third portion of said interchangeable segment structure are separate pieces.

19. The rotary labeling machine kit according to claim 11, wherein said first portion, said second portion, and said third portion of said interchangeable segment structure are separate pieces.

20. The rotary labeling machine kit according to claim 19, wherein:

said vacuum drum parts-accepting assembly comprises:

a circular upper cover portion;

a circular lower support portion; and a central rotatable shaft;

said central rotatable shaft is configured to pass coaxially through said upper cover portion upon assembly and said lower support portion;

said plurality of interchangeable segment structures have the same radius of curvature as said lower support portion, and are configured to be disposed coaxially with said lower support portion upon installation;

said lower support portion comprises a circular centering groove;

each of said plurality of interchangeable segment structures comprises a projecting flange;

said projecting flange of each of said plurality of interchangeable segment structures is configured to engage said centering groove of said lower support portion upon installation to center said interchangeable segment structures on said lower support portion;

said lower support portion comprises a plurality of centering studs; and each of said projecting flanges comprises an opening configured to receive one of said centering studs therethrough to further center said segments on said lower support portion;

said lower support portion comprises at least one vacuum passage;

each of said first, leading, vacuum devices and each of said second, trailing, vacuum devices comprises an interior vacuum passage being configured to connect said vacuum devices to said at least one vacuum passage upon attachment of each of said plurality of interchangeable segment structures to said lower support portion;

said plurality of interchangeable segment structures are disposed, upon installation, to cover and seal any of said vacuum passages not in connection with said vacuum devices;

each of said plurality of interchangeable segment structures is configured to be disposed adjacent another interchangeable segment structure to form a continuous peripheral side wall of a vacuum drum rotor;

each of said plurality of interchangeable segment structures comprising an inner curved portion and an outer curved portion;

said inner curved portion being shorter in height than said outer curved portion to form a shoulder in a top portion of its corresponding interchangeable segment structure;

said upper cover portion comprising: an outer ring portion, an inner ring portion, and a plurality of spokes connecting said outer ring portion and said inner ring portion;

said outer ring portion being configured to be disposed to contact said shoulders of said plurality of interchangeable segment structures across at least substantially the entire length thereof to clamp said interchangeable segment structures between said upper cover portion and said lower support portion; and a C-shaped clamping arrangement being configured to surround an upper portion of said shaft and to press and clamp said upper cover portion against said shoulders of said plurality of interchangeable segment structures; and said rotary labeling machine kit further comprises:

a rotor comprising a plurality of bottle or container supports disposed on and about the periphery thereof;

a rotary labeling unit being disposed adjacent said rotor and being configured to apply labels onto bottles or containers supported on said supports of said rotor;

a storage arrangement being configured and disposed to store a supply of labels having different lengths; and a label transport arrangement being configured and disposed to transport labels from said storage arrangement to said rotary labeling unit.

* * * * *